United States Patent Office 3,110,747
Patented Nov. 12, 1963

3,110,747
HOMOGENEOUS HYDROGENATION
CATALYSIS
Richard D. Mullineaux, Oakland, Calif., assignor to Shell Oil Company, New York, N.Y., a corporation of Delaware
No Drawing. Filed June 13, 1960, Ser. No. 35,434
2 Claims. (Cl. 260—683.9)

This invention relates to a novel process for the hydrogenation of hydrogenatable organic compounds. More particularly, it relates to a novel process for the hydrogenation of organic compounds characterized in that certain transition metal-phosphorus ester and amide complexes are employed as catalysts for the desired hydrogenation reaction.

It is an object of my invention to provide an improved method for the hydrogenation of organic compounds the use of highly stable homogeneous hydrogenation catalysts. Another object is to provide an improved hydrogenation process using transition metal-phosphorus ester and amide complexes as catalysts. Further objects will be apparent from the following detailed disclosure.

In accordance with the present invention, hydrogenatable organic compounds are hydrogenated by initimately contacting them with hydrogen under hydrogenation conditions of temperature and pressure in the presence of a complex between a transition metal in a valence state of less than $+1$ having an atomic number for 23 to 85, and a trivalent phosphorus compound having at least 1 ($R_wZ$)-radical bonded to the phosphorus atom, wherein R is a member of the class consisting of the alkyl, aryl, alkaryl, and aralkyl radicals and the halosubstitution products thereof, Z is an atom selected from the group consisting of oxygen, sulfur, and nitrogen atoms, and $w$ is a positive integer from 1 to 2, said complex serving as a homogeneous hydrogenation catalyst.

By homogeneous hydrogenation catalyst I mean one that forms a single phase with the reaction mixture The hydrogenation catalyst known in the art which have in the past proven to be of more than academic interest have all been heterogeneous catalysts. These known catalysts exist in a separate phase from the material to be catalyzed. By existing in a single phase with the hydrogenatable organic compounds used in my process, my novel catalysts achieve a uniform molecular dispersion not possible with a heterogeneous catalyst This uniformity leads to a high selectivity for the production of the desired end products because all of the catalytic sites are substantially similar. A homogeneous catalyst also makes the maximum amount of the catalyst available in a given reaction. A further advantage of a homogeneous catalyst is the fact that it is not possible to cover up the reactive sites during hydrogenation with coke for example, and thereby physically deactivate the catalyst.

The term "complex," as used throughout the specification and claims, means a coordination compound formed by the union of one or more already electronically rich molecules or atoms capable of independent existence with one or more electronically poor molecules or atoms, each of which are also capable of independent existence.

Besides being a very efficient catalyst for the hydrogenation reaction, one of the most important features of using these unique complexes as catalysts is their great stability. Catalyst stability refers to the ability of the catalyst to remain in its most active form throughout the reaction in which it is employed. Instability of the instant complexes would be evidenced by a dissociation of the complex and a precipitation of the metal. Other complex hydrogenation catalysts that have been used in the past have been rather unstable. It is therefore of prime advantage to use these novel complexes in an improved hydrogenation process and through their stability be permitted to employ either high or low hydrogen pressure, as may be desired.

While complexes of the type described above are generally applicable in my invention, complexes between transition metals belonging to groups VII and VIII of the periodic table and trivalent phosphorus compounds have been found to be most suitable and are preferred. Within this group, those transition metals belonging to group VIII of the periodic table most readily form complexes with trivalent phosphorus compounds and therefore are most preferred. Examples of the most preferred transition metals are iron, cobalt, nickel, rhodium, and platinum.

Complexes to be used that are within the scope of my invention are complexes having a transition metal of the type described above, with the further proviso that the metal be in a valence state of less than $+1$. Complexed metals in a valence state of 0 and $-1$ for example are particularly suitable. These low valence states contribute heavily to the over-all activity of the catalyst in the hydrogenation reaction.

The other portion of the complexes to be used in my invention is the trivalent phosphorus moiety. This portion of the complex is a trivalent phosphorus compound having at least one oxygen, or sulfur, or nitrogen atom bonded directly to the phosphorus atom which links the phosphorus atom to a radical R, as previously defined.

The complex between a trivalent phosphorus compound having but one such ester or amido group and one of the above-described transition metals is a complex suitable for use in my invention. This complex may be described as a phosphinite ester of an aliphatic or aromatic monohydric alcohol, or in the case of a nitrogen compound, an amidophosphinite of an alpihatic or aromatic amine. Similarly, the complex between a trivalent phosphorus compound having two or three such ester or amido groups and a transition metal of the group described are also suitable for use in my invention These complexes may in turn be described as phosphonites and amidophosphonites of aliphatic and aromatic monohydric alcohols and of aliphatic or aromatic amines respectively, in the case of a compound with two groups. In the case of a trivalent phosphorus compound having three such groups, it may be described as a phosphite or amidophosphite of aliphatic and aromatic monohydric alcohols and of aliphatic and aromatic amines respectively.

When the trivalent phosphorus compound has less than three ester or amido groups it is preferred that the valences of the phosphorus atom that are not inovlved in an ester or amido linkage should be satisfied by a radical selected from the same group as R in the previously defined radical. Thus, a preferred complex is a complex between a transition metal in a valence state of less than $+1$ selected from groups VII and VIII of the periodic table and a trivalent phosphorus compound represented by the formula $(R_wZ)_x$—P—$R'_y$, wherein Z is at atom selected from the group consisting of the oxygen, sulfur and nitrogen atoms, R and R' are members of the class consisting of the alkyl, aryl, alkaryl, and aralkyl radicals and halo-substitution products thereof, $w$ is a positive integer from 1 to 2, $x$ is a positive integer from 1 to 3, and $x+y=3$. Phosphorus compounds in which $x=3$ and which therefore contain three of the vital ester or amido groups are preferred. Although R and R' may contain over 20 carbon atoms and vary in structure over a considerable range, it is preferred that they be alkyl radicals of up to 20 carbon, since the rate of complex formation with these radicals is more rapid. Straight- and branched-chain alkyl radicals are equally suitable.

It will be apparent to those skilled in the art that the number of complexes suitable for use in my invention is very large. A representative sample only includes the following complexes (in all cases the metal valence state is less than $+1$):

Complex between—
- Vanadium and tributyl phosphite
- Cobalt and triphenyl thiophosphite
- Nickel and O,O-dimethyl-p-chlorophenyl thiophosphite
- Chromium and tris(diethylamino)phosphite
- Molybdenum and dimethylamino-dimethyl thiophosphite
- Tungsten and tris(2,6-dibromo-4-methyl phenyl) phosphite
- Manganese and S,S-dipentyl-$\beta$-bromoethyl thiophosphonite
- Rhenium and O,O-dimethyl-2,6-dimethylphenyl phosphonite
- Iron and O-ethyl-bis($\beta$-phenyl ethyl)phosphonite
- Ruthenium and dibutylamino-diethyl phosphite
- Palladium and tris(1,1,6-trihydroperfluorohexyl) phosphite
- Osmium and O,O-dieicosyl methyl thiophosphite
- Rhodium and triethyl phosphite The complexes to be used in my invention may be prepared by dissolving a salt of the transition metal in a trivalentphosphorus compound and hydrogenating the solution. It is only a matter of selecting the appropriate transition metal in salt form and the appropriate trivalent phosphorus compound to obtain any given complex. These are then combined under the following conditions to prepare the complexes used in my process.

The pressure and temperature of the system may be varied over a considerable range and still achieve the desired product. The particular metal chosen and the particular ester utilized will usually be the most important factor in governing the precise conditions to be used for optimum results. I have found that a temperature of from about 50° C. to abount 200° C. has been successful with a variety of reactants. A hydrogen pressure of from about less than one atmosphere to about 100 atmospheres is suitably employed with that temperature range. It is preferred to carry out my process at about 100° C. under about one to about 10 atmospheres of hydrogen.

Any salt of the transistion metal to be used in my process will be suitable. In particular, transition metal salts of inorganic and organic acids may be used. The salts of strong, non-oxidizing inorganic acids, such as of the hydrohalic acids, salts of weak non-oxidizing inorganic acids, such as of HCN, and salts of such organic acids as carboxylic acids may be used. Examples of preferred salts are chlorides, bromides, cyanides, acetates, propionates, butyrates, and the like. Hydrated salts are equally useful in my process. Although salts of the foregoing monobasic acids are preferred, salts of polybasic acids such as sulfuric, the sulfonic acids, phosphoric, and the phosphonic acids may also be used.

My novel complexes may be prepared from any mole ratio of the starting materials that will result in an appreciable amount of complex formation. A stoichiometric excess of the phosphorus compound over the transition metal salt will in general produce the desired results and is preferred, although smaller proportions of the phosphorus compound may be used if desired. Mole ratios of phosphorus compound to metal from less than 10 to 1 to over 50 to 1 may be used with good results. Larger concentrations of the metal have the effect of causing an increase in the rate of hydrogen uptake by the solution. Additional increases in the rate of reduction may be accomplished by the addition to the solution of a minor amount of suitable catalyst. Nitrobenzenes have been found to be suitable catalysts for this reaction.

The rate of reduction is also influenced by the particular phosphorus compound used for complex formation. For example, the rate of reduction of cobalt chloride decreases as the solvent is changed from triethyl phosphite to tris-(2-chlorethyl)phosphite to tricresyl phosphite. These relative rates seem to indicate a steric inhibition to complex formation.

Both the rate and extent of reduction are influenced by the anion present. For example, the rate of reduction in the presence of $CN^-$ is greater than in the presence of $Cl^-$ which is in turn greater than in the presence of acetate. Thus the maximum rate of reduction of $CoCl_2$ in the presence of added $CN^-$ was faster than in its absence in tri(2-ethylhexyl)phosphite - m - dinitrobenzene solution, and the maximum rate of reduction of $CoCl_2$ was faster than that of cobalt acetate in triethyl phosphite.

Regardless of the reactants and conditions employed, reduction proceeds relatively rapidly up to a point where a sharp break in the rate occurs, and then proceeds relatively slowly. This will be referred to as the "rate break" hereinafter. The rate break point is also influenced by the anion present. For example, only one atom of hydrogen is absorbed per atom of $CoCl_2$ or $Co(CN)_2$ before the rate break, while two atoms of hydrogen are absorbed per atom of $Co(acetate)_2$ before the rate break. These quantities of hydrogen correspond to reduction of $Co^{++}$ to the valence states of $+1$ and 0 respectively. By employing the suitable reactants and conditions it is thus possible to produce a complex having its transition metal in any desired positive or negative valence state.

It also is possible to add other biphyllic ligands to the complex before use in my invention. Addition of these other biphyllic ligands in some cases produces a more stable complex and in other cases will also increase the activity of the catalyst. By "biphyllic ligand" I mean a compound having an element with a pair of electrons capable of forming a coordinate bond with a metal atom and simultaneously having the ability to accept electrons from the metal, thereby providing additional stability to the resulting complex. The phosphorus compounds used to form the complex catalysts of my invention are excellent examples of biphyllic ligands. Examples of other suitable ligands that may be added to this complex prior to hydrogenation of the organic compound are many in number. To mention only a representative group of compounds having elements with the requisite electron structure of a biphyllic ligand would include compounds having non-transition elements of groups V and VI of the periodic table such as nitrogen, phosphorus, oxygen, sulfur, asenic, selenium, and antimony. Examples of biphyllic ligands of this group are diethyl thiourea, triphenyl arsine, triphenyl stibene, and the like. A typical nitrogen biphyllic ligand is pyridene. Bidentate-biphyllic ligands are also suitable. These are compounds which contain two biphyllic ligand sites of activity. An example of this type of a compound is phenanthroline. Another type of suitable ligand is the $C=O$ molecule found in carbon monoxide gas.

My invention is generally applicable to the hydrogenation of any organic compound that is capable of undergoing hydrogenation by reaction with hydrogen in the presence of a hydrogenation catalyst. It thus is suitable for adding hydrogen to carbon-to-carbon unsaturated linkage of unsaturated aliphatic, of unsaturated cycloaliphatic, and of aromatic compounds. It also is applicable to reduce oxidation state of functional groups present in aliphatic, cycloaliphatic, and aromatic compounds. It is possible to achieve both of the foregoing simultaneously if the particular compound involved contains both carbon-to-carbon unsaturation and a reducible functional group. In a compound of this latter type, it is also possible to selectively hydrogenate the functional group or carbonto-carbon unsaturation by appropriate choice of generally milder reaction conditions.

The invention is used to advantage in the hydrogenation of carbon-to-carbon unsaturated linkages in hydrocarbons. The unsaturation may be ethylenic as in the mono-olefins such as ethylene, propylene, and butylene, or acetylenic as in the mono-alkynes such as acetylene and 3-pentyne. It is possible to saturate branched- and straight-chain acyclic hydrocarbon compounds having one or more of these ethylenic and/or acetylenic sites. These sites may be conjugated as in 1,3-butadiene or non-conjugated as in 1,5-hexadiene. The unsaturated carbon-to-carbon linkages may be between terminal and their adjacent carbon atoms, as in 1-pentene, or between two internal chain carbon atoms, as in 4-octene.

Macromolecular materials involving acyclic units of the above types such as polyolefins like polyethylene, polybutadiene, as well as copolymers of olefins like the ethylene-propylene copolymer are also within the scope of applicability of this invention.

Hydrocarbon cyclic compounds are equally suitable for use in this invention. This group includes the unsaturated alicyclic hydrocarbon such as the cyclic olefins containing carbon-to-carbon unsaturation such as the cycloalkenes like cyclopentene, cyclohexene, cycloheptene, having one or more unsaturated sites. Also included in this category are the terpenes and fused-ring polycyclic olefins such as 2,5-bicyclo-(2.2.1)-heptadiene, 1,4,4a,5,-8,8a - hexahydro - 1,4,5,8 - dimethanonaphthalene and the like.

Suitable cyclic hydrocarbons includes the aromatic compounds such as benzene, polycyclics such as naphthalene and anthracene, as well as their aliphatic hydrocarbon analogs such as toluene, alpha-ethyl naphthalene, and the like.

Compounds having combinations of both acyclic and cyclic carbon-to-carbon unsaturated sites of the foregoing types may have their degree of unsaturation reduced or be completely saturated by the process of this invention.

The process of this invention may also be used to hydrogenate unsaturated carbon-to-carbon linkages of non-hydrocarbons without reducing any functional groups present. Thus, it is possible to hydrogenate unsaturated alcohols, aldehydes, and acids to corresponding alcohols, aldehydes, and acids containing a lesser degree of carbon-to-carbon unsaturation or to corresponding saturated analogs. The carbon-to-carbon unsaturation may be present in a cyclic, acyclic, or heterocyclic molecule. For example, hydrogenation of acrolein would produce propionaldehyde, hydrogenation of allyl alcohol would produce n-propyl alcohol, hydrogenation of acrylic acid would produce propionic acid, hydrogenation of propargyl alcohol may produce allyl alcohol and/or n-propyl alcohol, and hydrogenation of 1-hydroxy-2,4-pentadiene may produce 1-hydroxy-2-pentene and/or 1-pentanol. Similarly, unsaturated amines, esters, and other types of compounds may be hydrogenated to reduce the degree of unsaturation. For example, hydrogenation of allyl acrylate or allyl amine would produce propyl acrylate and propyl amine, respectively.

In the same manner, alicyclic compounds and aromatic compounds similar in structure to the cyclic hydrocarbons previously discussed but which also have functional groups containing oxygen, nitrogen, or sulfur, may have their carbon-to-carbon unsaturation reduced as in the pure hydrocarbon but without reducing any functional group or groups present. Examples of alicyclic compounds are cyclohexenyl alcohol, cyclopentenyl amine, and methyl cyclobutenyl thioate. Examples of aromatic compounds are phenol, aniline, and benzene sulfonic acid.

Heterocyclic compounds may also have any carbon--to-carbon unsaturation present in the molecule selectively saturated by the process of this invention. Included within this category are nitrogen-containing bases such as pyridine as well as oxygen-containing heterocyclics such as furans, pyrans, and the acrolein dimer.

Non-hydrocarbon macromolecular materials such as polymers of aldehydes, e.g., polyacrolein, are also within the scope of applicability of this invention and may have their carbon-to-carbon unsaturation selectively hydrogenated.

On the other hand, non-hydrocarbons containing hydrogenatable functional groups may be hydrogenated by the process of this invention to reduce the oxidation state of the functional groups. As previously mentioned, these functional group or groups may be selectively reduced in the presence of carbon-to-carbon unsaturation or concurrently reduced while the carbon to carbon linkage is saturated. Examples of hydrogenation for the purpose of reducing the oxidation state of functional groups would be the reduction of aldehydes and ketones to alcohols, the reduction of alcohol to hydrocarbons, the reduction of acids to aldehydes and ketones, the reduction of nitriles to amines, the reduction of nitro groups to amino groups, the reduction of epoxides to alcohols and/or hydrocarbons, the reduction of mercapto groups to hydrocarbons such as occurs in the "sweetening" of petroleum, and the like.

These hydrogenatable functional groups may be present in any organic compound such as any of the various types of compounds herein described and may be suitably employed in the present invention. Hydrogenatable functional groups containing oxygen, nitrogen, or sulfur and substituted on any of the hydrocarbons previously discussed or their saturated analogs constitute a group of suitable compounds of particular interest within the scope of applicability of this invention.

Specific examples of a few of the types of hydrogenatable organic compounds that may be hydrogenated in accordance with my invention and the products obtained include the following:

Addition of hydrogen to unsaturated linkages of aromatic, aliphatic, and cycloaliphatic hydrocarbons:

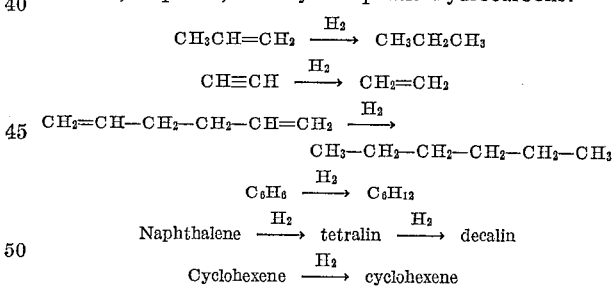

Reduction of functional groups

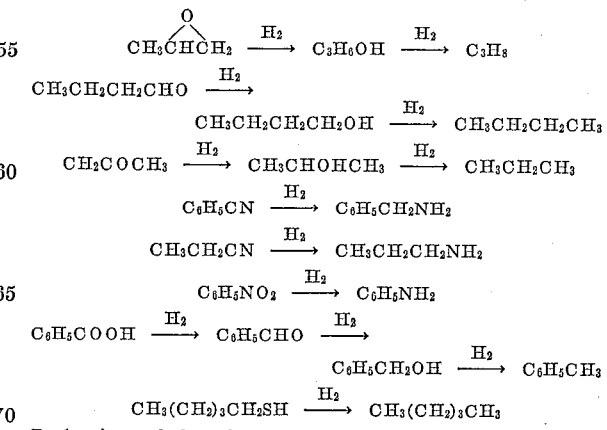

Reduction of functional groups along with cleavage of molecules

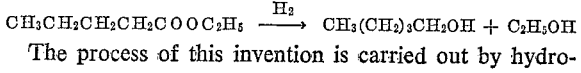

The process of this invention is carried out by hydrogenating the hydrogenatable organic compound in liquid phase at hydrogenation pressure and temperature. The precise hydrogen pressure used in my invention may accordingly be selected from over a considerable range. However, due to the unusually superior activity of my catalysts, it is possible to carry out the hydrogenation reaction at relatively low pressures. Pressures of hydrogen as low as 5 p.s.i.a. or less have been found to produce good yields. Although very high pressure may also be employed when desired, it is preferred to use pressures between about 5 p.s.i.a. and about 1000 p.s.i.a.

Temperatures likewise may be varied readily to any convenient point with equally successful results. Possible decomposition of the compound to be hydrogenated and attainment of reasonably rapid reaction rates are two of the more important factors to be considered in choosing the temperature. Generally, temperatures between about 100° C. and 300° C. will prove satisfactory.

Ratios of catalyst to the compound to be hydrogenated are not particularly critical and may be varied in order to achieve a homogeneous solution. Solvents are therefore generally not required although inert solvents such as saturated hydrocarbons may be used if desired. In general, larger quantities of catalyst will produce a faster reaction rate. Ratios between 1:100 and 10:1 will normally accomplish the desired effect. If another biphyllic ligand is added to the solution before hydrogenation, about the same ratios may be used. When the reaction has gone to completion, the hydrogenated compound may be removed from the reaction mixture by any suitable means. Normally, distillation, filtration, or extraction with a solvent will be employed, although other methods may be adapted when required. The following examples will best explain the details of the procedure to be followed in my invention. It is to be understood that these examples are given only for the purpose of illustration and are not to be construed as limiting my invention in any way.

The reactor used was a 100 ml. stainless steel autoclave connected to a 0 to 100 p.s.i.a. transducer and to sources of hydrogen and vacuum. The volume of these external fittings was kept to a minimum to provide the maximum sensitivity of pressure to the change in number of millimoles of hydrogen present. The catalyst and compound to be hydrogenated were charged to the reactor, a Teflon-covered magnetic stirring bar was added, and the reactor was closed, evacuated and pressured with hydrogen until all foreign gases were displaced. The reactor was then heated under vacuum. After the temperature reached the desired point, the $H_2$ pressure was increased to the designated run pressure and the pressure reduction was recorded. If a large amount of hydrogen was absorbed, the reactor was repressured at suitable intervals.

The catalyst may be prepared separately and charged to the reactor along with the compound to be hydrogenated. Alternatively, the catalyst may be first prepared in the above-described equipment, at which time the compound to be hydrogenated is added to the solution in the same equipment. This latter procedure was used in the examples to follow and is the preferred procedure. A small quantity of base such as KOH may be added to the reaction mixture to neutralize acidity produced by salts in the mixture.

It is also possible to add the reactants necessary for the preparation of the catalyst (a salt of the transition metal and a trivalent phosphorus compound) to the reactor at the same time that the compound to be hydrogenated is added. During hydrogenation the catalyst will be formed in situ and will then catalyze the hydrogenation of the added compound.

In all cases the cobalt salt used was cobalt acetate. The use of this salt leads to the production of the zero and −1 valence state cobalt-trivalent phosphorus ester complexes used as catalysts in the following hydrogenation reactions. Both valence states and mixtures thereof are equally suitable.

*Example I*

This example illustrates the general applicability of my invention to the saturation of both aliphatically and aromatically unsaturated linkages by hydrogenation. Using the above-described procedure under a hydrogen pressure of 550 p.s.i.a., the following results were obtained.

| Run No. | Catalyst Prepared from— | | Organic Compound to be Hydrogenated | | Temp., °C. | Millimoles $H_2$ | | Product |
|---|---|---|---|---|---|---|---|---|
| | Triethyl Phosphite, ml. | Cobalt Acetate, millimoles | Identity | ml. | | Maximum Rate of Absorption per Hour | Total Absorbed | |
| 1 | 10 | 5 | 1-octene | 20 | 195 | 12.4 | 6.9 | n-octane. |
| 2 | 30 | 2 | do | 30 | 195 | 2.1 | 30 | Do. |
| 3 a | 30 | 2 | do | 30 | 195 | 1.0 | 19 | Do. |
| 4 b | 15 | 2 | do | 15 | 195 | 5.2 | 31 | Do. |
| 5 c | 10 | 5 | do | 15 | 150 | 3.5 | 36 | Do. |
| 6 | 30 | 2 | naphthalene | 15 g. | 220 | 1.1 | 18 | tetralin. | a Two pellets of KOH added to the reactor after preparation of the catalyst.
b Two millimoles of phenanthroline were added to the prepared catalyst before hydrogenation of the 1-octene. An insoluble complex formed but was dissolved in 15 ml. of diethylene glycoldiethyl ether.
c Catalyst contained carbon monoxide as a secondary biphyllic ligand. It was prepared by adding 2.5 millimoles of dicobaltoctacarbonyl to the triethyl phosphite. It may also be prepared by adding carbon monoxide gas to a cobalt acetate-triethyl phosphite solution and then hydrogenating the solution.

*Example II*

This example illustrates the applicability of my invention to the reduction of the oxidation state of functional groups of organic compounds by hydrogenation. The same general equipment and procedure as previously described was employed using 15 ml. of reduced cobalt-triethyl phosphite catalyst with 15 ml. of benzaldehyde.

Temperature _____ °C__ 150
Initial $H_2$ pressure _____p.s.i.a__ 85

The reaction was run a number of times with the total $H_2$ reacting varying from 27.1 to 37.7 millimoles. The reaction products included benzyl alcohol, part of which was in turn reduced to toluene.

*Example III*

This example illustrates the use of catalysts within the scope of my invention that are prepared from transition metals other than cobalt.

The equipment and procedure were again as previously described. Two runs were made using first a nickel complex and then a platinum complex as follows:

| I | II |
|---|---|
| Catalyst:<br>15 ml. triethyl phosphite.<br>2 millimoles nickel salt.<br>15 ml. benzaldehyde.<br>85 p.s.i.a. $H^2$.<br>185° C.<br>Product: Toluene. | Catalyst:<br>15 ml. triethyl phosphite.<br>2 millimoles platinum salt.<br>15 ml. benzaldehyde.<br>85 p.s.i.a. $H^2$.<br>150° C.<br>Product: Toluene and benzyl alcohol. |

I claim as my invention:

1. In a process for the catalytic hydrogenation in the liquid phase of a member of the group consisting of acyclic hydrocarbons containing olefinic unsaturation, acyclic hydrocarbons containing acetylenic unsaturation, mono- and bi-cyclic hydrocarbons containing olefinic unsaturation, mono- and bi-cyclic aromatic hydrocarbons, the substituted derivatives of said hydrocarbons wherein the substituent is selected from the group consisting of aldehydo, keto, carboxyl, esterified carboxyl, hydroxyl, epoxy, cyano, nitro, mercapto, and amino, heterocycles selected from the group consisting of furan, pyran and acrolein dimer and saturated hydrocarbons having a substituent selected from the group consisting of aldehydo, keto, carboxyl, esterified carboxyl, hydroxyl, epoxy, cyano, nitro and mercapto, the improvement of carrying out said hydrogenation using a homogenous hydrogenation catalyst which is a coordination complex of the formula $$(R_wZ)_x-P-(R')_y \cdot M$$

where Z is an atom selected from the group consisting of the oxygen, sulfur and nitrogen atoms, M is a member of the group consisting of vanadium, cobalt, nickel, chromium, molybdenum, tungsten, manganese, rhenium, iron, ruthenium, palladium, osmium, rhodium and platinum in a valence state of less than $+1$, R and R' are members of the class consisting of alkyl, haloalkyl, aryl, haloaryl, aralkyl and alkaryl, $w$ is a positive integer from 1 to 2 inclusive, $x$ is a positive integer from 1 to 3 inclusive, and $y$ is a positive integer from 0 to 2 such that $x+y=3$, the hydrogenation being carried out at about 50° to about 300° C. and under a pressure of about 5 p.s.i.a. to about 100 atmospheres.

2. A process in accordance with claim 1 wherein carbon-to-carbon unsaturated linkages of ethylenic hydrocarbon are hydrogenated.

References Cited in the file of this patent
UNITED STATES PATENTS 2,802,876    Broich et al. _____ Aug. 13, 1957
2,840,617    Shokal _____ June 24, 1958